(12) United States Patent
Cremer

(10) Patent No.: US 12,387,745 B2
(45) Date of Patent: *Aug. 12, 2025

(54) METHODS AND APPARATUS TO DETERMINE AUDIO QUALITY

(71) Applicant: Gracenote, Inc., Emeryville, CA (US)

(72) Inventor: Markus Kurt Cremer, Orinda, CA (US)

(73) Assignee: Gracenote, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/592,032

(22) Filed: Feb. 29, 2024

(65) Prior Publication Data

US 2024/0203444 A1    Jun. 20, 2024

Related U.S. Application Data

(63) Continuation of application No. 17/452,017, filed on Oct. 22, 2021, now Pat. No. 11,948,598.

(60) Provisional application No. 63/104,226, filed on Oct. 22, 2020.

(51) Int. Cl.
| | |
|---|---|
| *G10L 25/60* | (2013.01) |
| *G06F 16/683* | (2019.01) |
| *G06N 3/04* | (2023.01) |
| *G06N 3/08* | (2023.01) |
| *G10L 25/18* | (2013.01) |
| *G10L 25/30* | (2013.01) |
| *H04R 3/04* | (2006.01) |

(52) U.S. Cl.
CPC ............ *G10L 25/60* (2013.01); *G06F 16/683* (2019.01); *G06N 3/04* (2013.01); *G06N 3/08* (2013.01); *G10L 25/18* (2013.01); *G10L 25/30* (2013.01); *H04R 3/04* (2013.01)

(58) Field of Classification Search
CPC ......... G10L 25/60; G10L 25/18; G10L 25/30; G06F 16/683; G06N 3/04; G06N 3/08; H04R 3/04
See application file for complete search history.

(56) References Cited

U.S. PATENT DOCUMENTS

| | | | |
|---|---|---|---|
| 7,164,771 B1 * | 1/2007 | Treurniet | G10L 25/69 |
| | | | 704/E19.002 |
| 9,055,376 B1 * | 6/2015 | Postelnicu | G06F 16/683 |
| 9,299,364 B1 * | 3/2016 | Pereira | G06F 3/165 |
| 9,380,383 B2 * | 6/2016 | Brenner | H04N 21/4325 |
| 9,799,081 B1 * | 10/2017 | Lewis | G06Q 50/01 |
| 9,984,705 B2 | 5/2018 | Sokolov | |
| 10,223,438 B1 | 3/2019 | Xu | |
| 10,283,142 B1 | 5/2019 | Yu | |
| 10,373,611 B2 | 8/2019 | Jeyachandran | |

(Continued)

*Primary Examiner* — Olisa Anwah
(74) *Attorney, Agent, or Firm* — McDonnell Boehnen Hulbert & Berghoff LLP

(57) ABSTRACT

Methods, apparatus, systems and articles of manufacture are disclosed to determine audio quality. Example apparatus disclosed herein include an equalization (EQ) model query generator to generate a query to a neural network, the query including a representation of a sample of an audio signal. Example apparatus disclosed herein also include an EQ analyzer to access a plurality of equalization settings determined by the neural network based on the query; and compare the equalization settings to an equalization threshold to determine if the audio signal is to be removed from subsequent processing.

20 Claims, 9 Drawing Sheets

(56) References Cited

U.S. PATENT DOCUMENTS

| | | |
|---|---|---|
| 11,138,989 B2 | 10/2021 | Seetharaman |
| 11,227,614 B2* | 1/2022 | Torrini .................... G10L 19/02 |
| 11,462,237 B2* | 10/2022 | Yao ......................... G06N 3/08 |
| 11,544,565 B2* | 1/2023 | Lyske .................. G06F 16/639 |
| 2009/0290725 A1 | 11/2009 | Huang |
| 2013/0178964 A1* | 7/2013 | Bergmann ............. H04S 7/308 |
| | | 700/94 |
| 2015/0073574 A1* | 3/2015 | Brenner ................. G06F 3/165 |
| | | 700/94 |
| 2016/0342598 A1* | 11/2016 | Jehan ................... G11B 27/031 |
| 2017/0048615 A1 | 2/2017 | Son |
| 2017/0070817 A1 | 3/2017 | Seo |
| 2017/0193362 A1 | 7/2017 | Cremer |
| 2019/0131948 A1* | 5/2019 | Cho ....................... H03G 7/002 |
| 2019/0199781 A1 | 6/2019 | Fuzell-Casey |
| 2020/0177146 A1* | 6/2020 | Mohapatra ............ H03G 5/025 |
| 2020/0226177 A1* | 7/2020 | Mejia Cobo ........... G06F 16/64 |
| 2020/0286505 A1 | 9/2020 | Osborne |
| 2021/0158148 A1* | 5/2021 | Coover ................... G06N 3/08 |
| 2021/0264938 A1 | 8/2021 | Yao |
| 2021/0281904 A1 | 9/2021 | Calvert |
| 2023/0245674 A1 | 8/2023 | Serra |

* cited by examiner

METHODS AND APPARATUS TO DETERMINE AUDIO QUALITY

RELATED APPLICATION

This patent is a continuation of U.S. patent application Ser. No. 17/452,017, which was filed on Oct. 22, 2021, which claims the benefit of U.S. Patent Application No. 63/104,226, which was filed on Oct. 22, 2020, and is hereby incorporated herein by reference in its entirety.

FIELD OF THE DISCLOSURE

This disclosure relates generally to audio playback, and, more particularly, to methods and apparatus to determine audio quality.

BACKGROUND

In recent years, a multitude of media having various characteristics has been delivered using an increasing number of sources. Media can be received from more traditional sources (e.g., terrestrial radio), or from more recently developed sources, such as Internet-connected streaming devices. As these sources have developed, systems which are able to process and output audio from multiple sources have been developed as well. For example, audio corresponding to the media can be analyzed prior to being output via a speaker, or analyzed after the audio has been output via the speaker (e.g., collected via a metering device). Due to the various attributes of some of these devices, audio may be transmitted that has poor quality (e.g., requires significant adjustment to be output via a speaker).

BRIEF DESCRIPTION OF THE DRAWINGS

In general, the same reference numbers will be used throughout the drawing(s) and accompanying written description to refer to the same or like parts.

Figure 1:
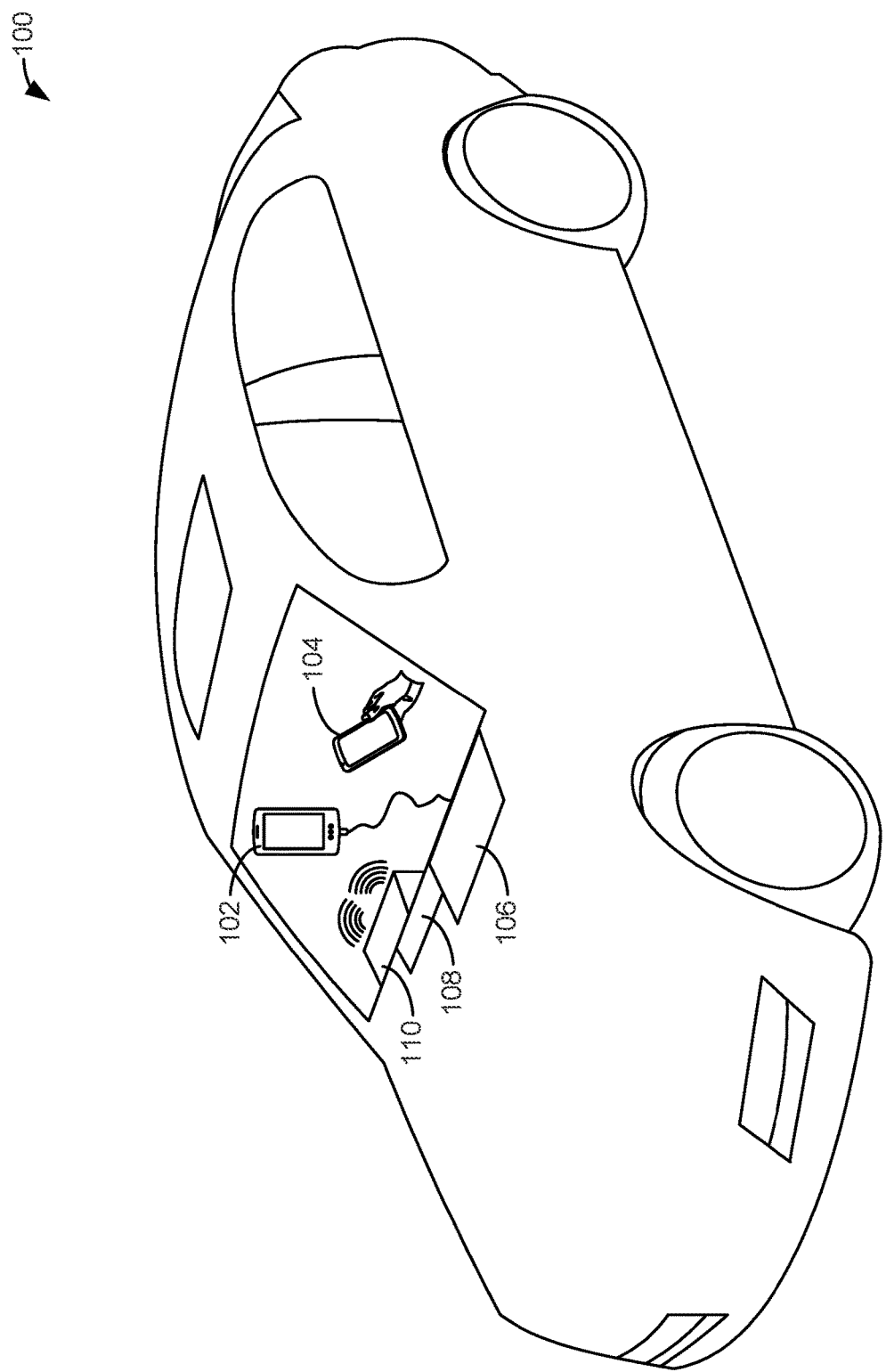
FIG. 1 is a schematic illustration of an example system constructed in accordance with teachings of this disclosure to determine audio quality.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

In conventional audio media implementations, audio signals associated with different media may have different characteristics. For example, different audio tracks may have different frequency profiles (e.g., volume levels of various frequencies of the audio signal), different overall (e.g., average) volumes, pitch, timbre, etc. For example, media on one CD may be recorded and/or mastered differently than media from another CD. Similarly, media retrieved from a streaming device may have significantly different audio characteristics than media retrieved from a different device, or media retrieved from the same device via a different application.

As users increasingly listen to media from a variety of different sources and from a variety of genres and types, differences in audio characteristics between sources and between media of the same source can become very noticeable, and potentially irritating to a listener. Audio equalization is a technique utilized to adjust volume levels of different frequencies in an audio signal. For example, equalization can be performed to increase the presence of low frequency signals, mid-frequency signals, and/or high-frequency signals based on a preference associated with a genre of music, an era of music, a user preference, a space in which the audio signal is output, etc. However, the optimal or preferred equalization settings may vary depending on the media being presented. In addition, presentation of media may have a number of issues (e.g., poor audio quality, etc.) that equalization may be unable to rectify. For example, performing equalization on media with poor audio quality will do little for a listener. Additionally, processing media with poor audio quality occupies valuable computing resources that could be utilized on audio with satisfactory audio quality.

In some conventional approaches, an equalization setting can be selected that is associated with a specific genre or type of music. For example, in a media unit on a vehicle, a listener may be able to select an equalizer for "Rock," which is configured to boost frequencies that a user may want to hear more of, and cut other frequencies which may be overpowering, based on typical characteristics of Rock music. However, such genre-specific broadly applied equalization settings fail to address nuances between different songs, and further still require a user to manually change the equalization setting at a beginning of a track of a different genre, which is increasingly common on radio stations and audio streaming applications. Further, some music may require additional equalization adjustments due to issues with quality. As used herein, "quality" refers to a threshold within a specific type of equalization adjustment (e.g., output of a given frequency range, frequency representation, etc.) for a specific type of audio. For example, when audio is determined to be associated with a "rock" genre, the quality of the audio will be compared against the equalization settings (e.g., frequency range) associated with the "rock" genre. As such, "satisfactory audio quality" refers to audio that is within the equalization threshold for a specific type of audio (e.g., rock, hip-hop, etc.).

In example methods, apparatus, systems and articles of manufacture disclosed herein, audio quality is determined based on audio playback settings (e.g., equalization settings, volume settings, etc.), which are dynamically adjusted (e.g., in real-time, after a brief delay, after a predetermine delay, etc.) based on characteristics of audio signals. Examples disclosed herein determine a simplified representation (e.g., a constant-Q transform representation) of a sample (e.g., a three second sample) of the audio signal and use a neural network to determine equalization settings specific to the audio signal. In some examples disclosed herein, the equalization settings include a plurality of filters (e.g., low-shelf filters, peaking filters, high shelf filters, etc.), one or more of which can be selected and applied to the audio signal. In example methods, apparatus, systems and articles of manufacture disclosed herein, the neural network that outputs equalization settings is trained using a library of reference media corresponding to a plurality of equalization profiles that are optimized for the media (e.g., as determined by audio engineers).

In example methods, apparatus, systems, and articles of manufacture disclosed herein, audio samples (e.g., including three seconds of audio) are converted to a constant-Q transform (CQT) representation and presented as an input to a neural network on a regular basis (e.g., every second) to determine equalization settings for the profile, to account for changes in the audio signal over time (e.g., different portions of the track having different characteristics, transitions in songs, transitions in genres, etc.). In example methods, apparatus, systems, and articles of manufacture disclosed herein, an audio production quality parameter is determined based on the output of the neural network. For example, if the output of the neural network (e.g., suggested EQ parameters) is above a quality threshold (e.g., a threshold EQ parameter based on music genre, a threshold EQ parameter based on user preferences, etc.), that audio signal (e.g., song, podcast, etc.) can be labeled as having poor audio quality and removed from presentation to a user (e.g., removed from playlist suggestions).

FIG. 1 is a schematic illustration of an example system 100 constructed in accordance with the teachings of this disclosure to determine audio quality. The example system 100 includes media devices 102, 104 that transmit audio signals to a media unit 106. The media unit 106 processes the audio signals and transmits the signals to an audio amplifier 108, which subsequently outputs the amplified audio signal to be presented via an output device 110.

The example media device 104 of the illustrated example of FIG. 1 is a mobile device (e.g., a cell phone). The example media device 104 stores or receives audio signals corresponding to media and is capable of transmitting the audio signals to other devices. In the illustrated example of FIG. 1, the media device 104 transmits audio signals to the media unit 106 wirelessly. In some examples, the media device 104 may use Wi-Fi, Bluetooth, and/or any other technology to transmit audio signals to the media unit 106. In some examples, the media device 104 may interact with components of a vehicle or other devices for a listener to select media for presentation in the vehicle. The media devices 102, 104 may be any devices which are capable of storing and/or accessing audio signals. In some examples, the media devices 102, 104 may be integral to the vehicle (e.g., a CD player, a radio, etc.). In some examples, the media unit 106 may receive audio from a content provider via a satellite or other communicating means.

The example media unit 106 of the illustrated example of FIG. 1 is capable of receiving audio signals and processing them. In the illustrated example of FIG. 1, the example media unit 106 receives media signals from the media devices 102, 104 and processes them to determine audio quality. The example media unit 106 is capable of monitoring audio that is being output by the output device 110 to determine the average volume level of audio segments, audio characteristics (e.g., frequency, amplitude, time values, etc.) and audio quality in real time. In some examples, the example media unit 106 is implemented as software and is included as part of another device, available either through a direct connection (e.g., a wired connection) or through a network (e.g., available on the cloud). In some examples, the example media unit 106 may be incorporated with the audio amplifier 108 and the output device 110 and may output audio signals itself following processing of the audio signals.

The example audio amplifier 108 of the illustrated example of FIG. 1 is a device that is capable of receiving the audio signal that has been processed by the media unit 106 and performing the appropriate playback setting adjustments (e.g., amplification of specific bands of the audio signal) for output by the output device 110. In some examples, the audio amplifier 108 may be incorporated into the output device 110. In some examples, the audio amplifier 108 amplifies the audio signal based on an amplification output value from the media unit 106. In some examples, the audio amplifier 108 amplifies the audio signal based on an input from a listener (e.g., a passenger or driver in a vehicle adjusting a volume selector).

The example audio output device 110 of the illustrated example of FIG. 1 is a speaker. In some examples, the audio output device 110 may be multiple speakers, headphones, or any other device capable of presenting audio signals to a listener. In some examples, the output device 110 may be capable of outputting visual elements as well (e.g., a television with speakers).

While the illustrated example system 100 of FIG. 1 is described in reference to an audio quality implementation in a vehicle, some or all of the devices included in the example system 100 may be implemented in any environment, and in any combination. For example, the system 100 may be in an entertainment room of a house, wherein the media devices 102, 104 may be gaming consoles, virtual reality devices, set top boxes, or any other devices capable of accessing and/or transmitting media. In some examples, the system 100 is entirely or partially implemented on a mobile device (e.g., one or more of the media devices 102, 104), and the mobile device can include one or more of the media unit 106, the audio amplifier 108, and/or the audio output device 110. Additionally, in some examples, the media can include visual elements as well (e.g., television shows, films, etc.).

Figure 2:
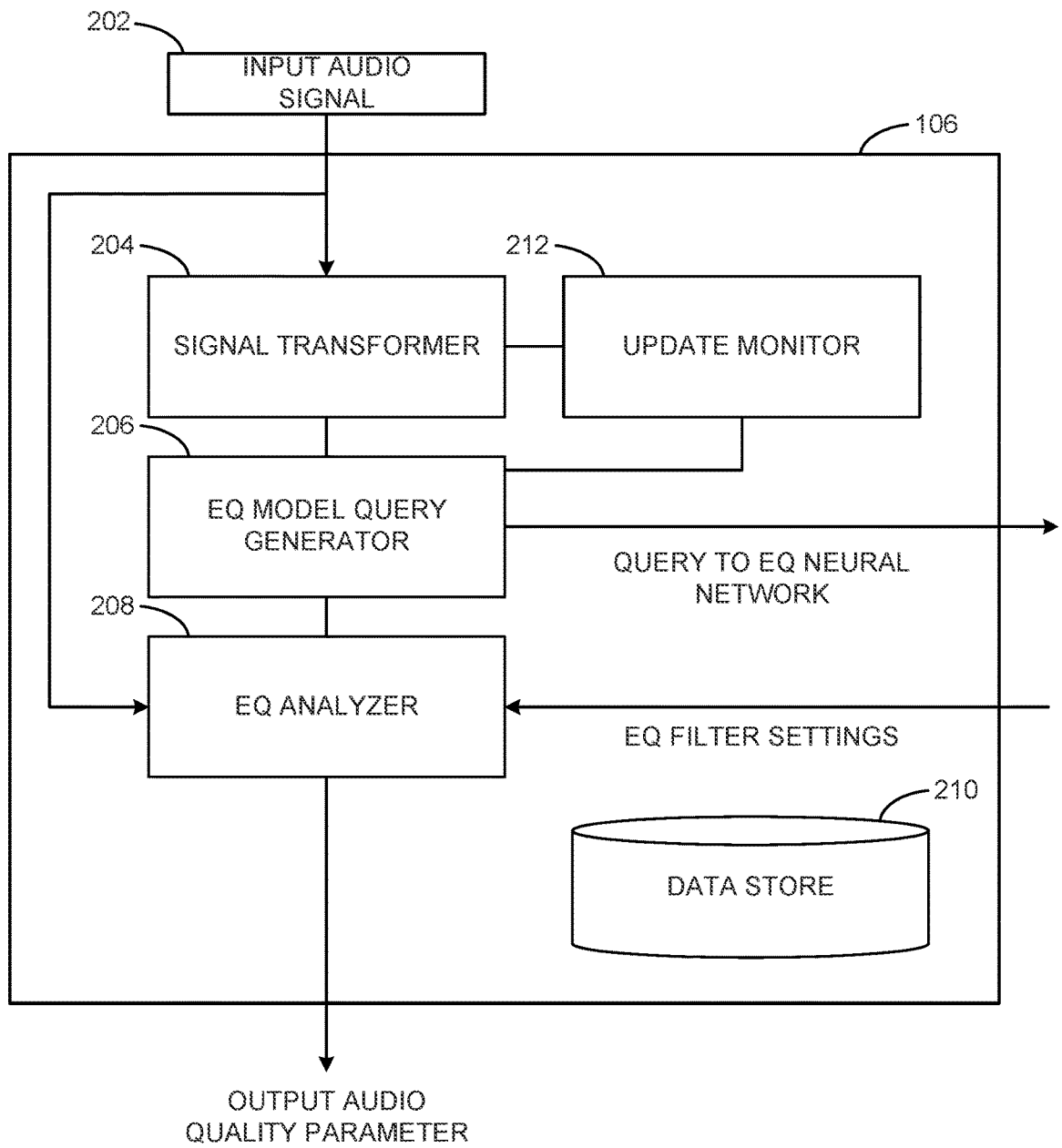
FIG. 2 is a block diagram showing additional detail of the media unit of FIG. 1.

FIG. 2 is a block diagram showing additional detail of the media unit 106 of FIG. 1. The example media unit 106 receives an input audio signal 202 and processes the signal to determine audio characteristics. The audio characteristics are then utilized to determine audio quality parameters based on the characteristics of the input audio signal 202. The media unit 106 transmits an output audio signal to the audio amplifier 108 for amplification prior to output by the output device 110. For example, the media unit 106 transmits an output audio signal to the audio amplifier 108 for amplification based on the determined audio quality parameters associated with the characteristics of the input audio signal 202.

The example media unit 106 includes an example signal transformer 204, an example equalization (EQ) model query generator 206, an example EQ analyzer 208, an example data store 210, and an example update monitor 212.

The example input audio signal 202 is an audio signal that is to be processed by the media unit 106 and output for presentation. The input audio signal 202 can be received and/or accessed by the media unit 106 from a radio signal (e.g., an FM signal, an AM signal, a satellite radio signal, etc.), from a compact disc, from an auxiliary cable (e.g., connected to a media device), from a Bluetooth signal, from a Wi-Fi signal, and/or from any other medium. For example, the input audio signal 202 can be received and/or accessed by the signal transformer 204, the EQ analyzer 208, and/or the update monitor 212. Additionally, the input audio signal 202 of the illustrated example is transformed by the EQ analyzer 208.

The example signal transformer 204 of the illustrated example of FIG. 2 transforms the input audio signal 202 to a simplified and/or characteristic representation of the audio signal. For example, the signal transformer 204 can transform the input audio signal 202 to a CQT representation. In some examples, the signal transformer 204 transforms the input audio signal 202 using a Fourier transform. In some examples, the signal transformer 204 continually transforms the input audio signal 202 into a simplified and/or characteristic representation, while in other examples the signal transformer 204 transforms the input audio signal 202 at a regular interval or in response to a demand (e.g., whenever it is required for dynamic audio playback settings adjustment) from one or more other components of the media unit 106. In some examples, the signal transformer 204 transforms the input audio signal 202 in response to a signal from the update monitor 212 (e.g., to update the audio quality parameter based on a predetermined time interval). The signal transformer 204 of the illustrated example communicates the simplified and/or characteristic representation of the audio signal to the EQ model query generator 206. In some examples, the signal transformer 204 provides means for transforming a signal. For instance, the means for transforming a signal can transform the input audio signal 202 to a simplified and/or characteristic representation of the audio signal or a CQT representation. In some examples, the means for transforming a signal transforms the input audio signal 202 using a Fourier transform.

The EQ model query generator 206 of the illustrated example of FIG. 2 generates and/or communicates EQ queries based on the simplified and/or characteristic representation of the input audio signal 202. The EQ model query generator 206 selects one or more simplified representation(s) corresponding to a sample time frame (e.g., a three second sample, a ten second sample, etc.) of the input audio signal 202 and communicates the simplified representation(s) to a neural network (e.g., an EQ neural network 302 of FIG. 3). The sample time frame corresponds to a duration of the input audio signal 202 that should be considered when determining an audio playback settings. In some examples, an operator (e.g., a listener, an audio engineer, etc.) can configure, adjust and/or vary (e.g., increase or decrease) the sample time frame. In some examples, the EQ model query generator 206 communicates the query (e.g., including the simplified representation(s) of the input audio signal 202) to a neural network via a network. In some examples, the EQ model query generator 206 queries a model that is stored on (e.g., at the data store 210), and executes on, the media device 106. In some examples the EQ model query generator 206 generates a new query to determine an updated audio quality parameter in response to a signal from the update monitor 212. In some examples, the EQ model query generator 206 provides means for generating an EQ model query. For instance, means for generating an EQ model query can generate and/or communicate EQ queries based on a simplified and/or characteristic representation of the input audio signal 202.

The EQ analyzer 208 of the illustrated example of FIG. 2 accesses EQ filter settings and calculates filter coefficients to be applied to the input audio signal 202. The EQ analyzer 208 receives, obtains and/or accesses EQ filter settings output by the EQ neural network (e.g., the EQ neural network 302 of FIG. 3). In some examples, the EQ filter settings can include one or more gain values, frequency values (e.g., frequency representation), Q values, and/or any other suitable value(s). In some examples, the EQ filter settings include multiple filters (e.g., one low-shelf filter, four peaking filters, one high-shelf filter, etc.). In some such examples, individual filters include multiple adjustment parameters, such as one or more gain values, one or more frequency values, one or more Q values and/or any other values and/or combinations thereof. In some examples, the EQ analyzer 208 utilizes different equations to calculate filter coefficients based on filter type. For example, a first equation can be utilized to determine a first filter coefficient for a low-shelf filter, and a second equation different than the first equation can be utilized to determine a second filter coefficient for a high shelf filter. The EQ analyzer 208 determines which one or more sets of EQ filter settings should be processed (e.g., by calculating filter coefficients) to be applied to the input audio signal 202 to determine an audio quality parameter.

The example EQ analyzer 208 of the illustrated example of FIG. 2 selects one or more of the filters (e.g., one or more of a low-shelf filter, a peaking filter, a high-shelf filter, etc.) to be applied to the input audio signal 202. In particular, the EQ analyzer 208 of the illustrated example selects one or more filters that have the highest magnitude gain (and thus will likely have the largest impact on the input audio signal 202). In some examples, such as when a specific number of filters are to be utilized (e.g., five band filters), one or more additional filters represented by EQ filter settings can be discarded. In some examples, the EQ analyzer 208 determines filters that will have the least perceptible impact to a listener and discards (e.g., or does not apply) these filters. For example, the EQ analyzer 208 can include an EQ filter selector that integrates over one or more filter's spectral envelope and compares this output between filters to determine which of the filters represented by the EQ filter settings should be discarded, ignored or not applied. In some examples, the EQ analyzer 208 communicates to the signal transformer 204 and/or the EQ model query generator 206 which of the filters are to be applied to the input audio signal 202.

The EQ analyzer 208 of the illustrated example of FIG. 2 applies the filters to determine an audio quality parameter. For example, the EQ analyzer 208 can adjust amplitude, frequency, and/or phase characteristics of the input audio signal 202 based on filter coefficients (e.g., provided by the applied filters). In some examples, the EQ analyzer 208 analyzes the filters and/or settings to be applied to the input audio signal 202 based on a particular genre of music that was identified. For example, the neural network may have identified the input audio signal 202 as corresponding to the "rock" genre. As such, the EQ analyzer 208 may access the data store 210 to determine the appropriate EQ settings that are to be applied to the input audio signal 202. In some examples, the EQ analyzer 208 determines a threshold amount of EQ that is to be applied to the input audio signal 202 based on a specified genre (e.g., filters for a particular type of music, coefficients for a particular type of music, etc.). For example, if a required EQ adjustment exceeds a threshold, the EQ analyzer 208 can identify the input audio signal 202 as having poor audio quality (e.g., not satisfactory audio quality) because modifying such a signal would require additional EQ adjustments beyond the EQ parameters associated with the rock genre that was first identified. In some examples, the EQ analyzer 208 stores this determination in the data store 210, and/or remove the input audio signal 202 from subsequent processing. However, if the EQ analyzer 208 determines that the EQ adjustments from the neural network are within a threshold of the rock genre, then the input audio signal 202 is identified as satisfactory audio quality and is utilized in subsequent processing (e.g., playlist recommendation, audio analysis, etc.). In some examples, the EQ analyzer 208 provides means for accesses EQ filter settings and/or means for calculating filter coefficients to be applied to the input audio signal 202. In some examples, the EQ analyzer 208 provides means for selecting one or more of the filters (e.g., one or more of a low-shelf filter, a peaking filter, a high-shelf filter, etc.) to be applied to the input audio signal 202. In some examples, the EQ analyzer 208 provides means for applying the filters to determine an audio quality parameter.

The example data store 210 of the illustrated example of FIG. 2 stores an output model from the EQ neural network, EQ filter settings, smoothing filter settings, an audio signal buffer, and/or any other data associated with the audio production quality process implemented by the media unit 106. The data store 210 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory, etc.). The data store 216 can additionally or alternatively be implemented by one or more double data rate (DDR) memories, such as DDR, DDR2, DDR3, mobile DDR (mDDR), etc. The data store 210 can additionally or alternatively be implemented by one or more mass storage devices such as hard disk drive(s), compact disk drive(s) digital versatile disk drive(s), etc. While, in the illustrated example, the data store 210 is illustrated as a single database, the data store 210 can be implemented by any number and/or type(s) of databases. Furthermore, the data stored in the data store 210 can be in any data format such as, for example, binary data, comma delimited data, tab delimited data, structured query language (SQL) structures, etc. In some examples, the data store 210 provides means for storing data.

The example update monitor 212 of the illustrated example monitors a duration between audio quality calculations and determines when an update duration threshold is satisfied. For example, the update monitor 212 can be configured with a one second update threshold, whereby the EQ model query generator 206 queries the EQ neural network (e.g., the EQ neural network 302) (e.g., every second) to determine or identify new playback settings (e.g., to determine an audio quality parameter). In some examples, the update monitor 212 communicates with the signal transformer 204 to simplify a sample (e.g., a three-second sample, a five-second sample, etc.) of the input audio signal 202 to initiate the process of determining audio quality. In some examples, the update monitor 212 provides means for monitoring a duration between audio quality calculations and/or provides means for determining when an update duration threshold is satisfied. In some examples, the update monitor 212 provides means for comparing an update duration and an update duration threshold.

In operation, the signal transformer 204 accesses the input audio signal 202 and transforms the input audio signal into a simplified and/or characteristic form, which is then utilized by the EQ model query generator 206 to query a neural network to determine EQ filter settings. The neural network returns EQ settings which are analyzed and processed (e.g., converted into applicable filter coefficients) by the EQ analyzer 208. The EQ analyzer 208 determines one or more of the filters represented by the EQ settings to apply to the input audio signal 202. The EQ analyzer 208 compares the selected filters to an EQ threshold from the data store 210 to determine if the playback adjustment settings are within adjustment settings for the particular music genre identified, for example. The update monitor 212 monitors a duration since previous audio quality parameters were calculated and updates the audio quality parameter when an update duration threshold is satisfied or identified. Additionally, if a determination is made that the playback adjustment settings are within the adjustment settings, the EQ analyzer 208 modifies the input audio signal 202 to generate the output audio quality parameter. While an example manner of implementing the media unit 106 of FIG. 1 is illustrated in FIG. 2, one or more of the elements, processes and/or devices illustrated in FIG. 2 may be combined, divided, re-arranged, omitted, eliminated and/or implemented in any other way. Further, the example signal transformer 204, the example EQ model query generator 206, the example EQ analyzer 208, the example data store 210, the example update monitor 212 and/or, more generally, the example media store 106 of FIG. 2 may be implemented by hardware, software, firmware and/or any combination of hardware, software and/or firmware. Thus, for example, any of the example signal transformer 204, the example EQ model query generator 206, the example EQ analyzer 208, the example data store 210, the example update monitor 212 and/or, more generally, the example media store 106 of FIG. 2 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example signal transformer 204, the example EQ model query generator 206, the example EQ analyzer 208, the example data store 210, the example update monitor 212 and/or, more generally, the example media store 106 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example media store 106 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
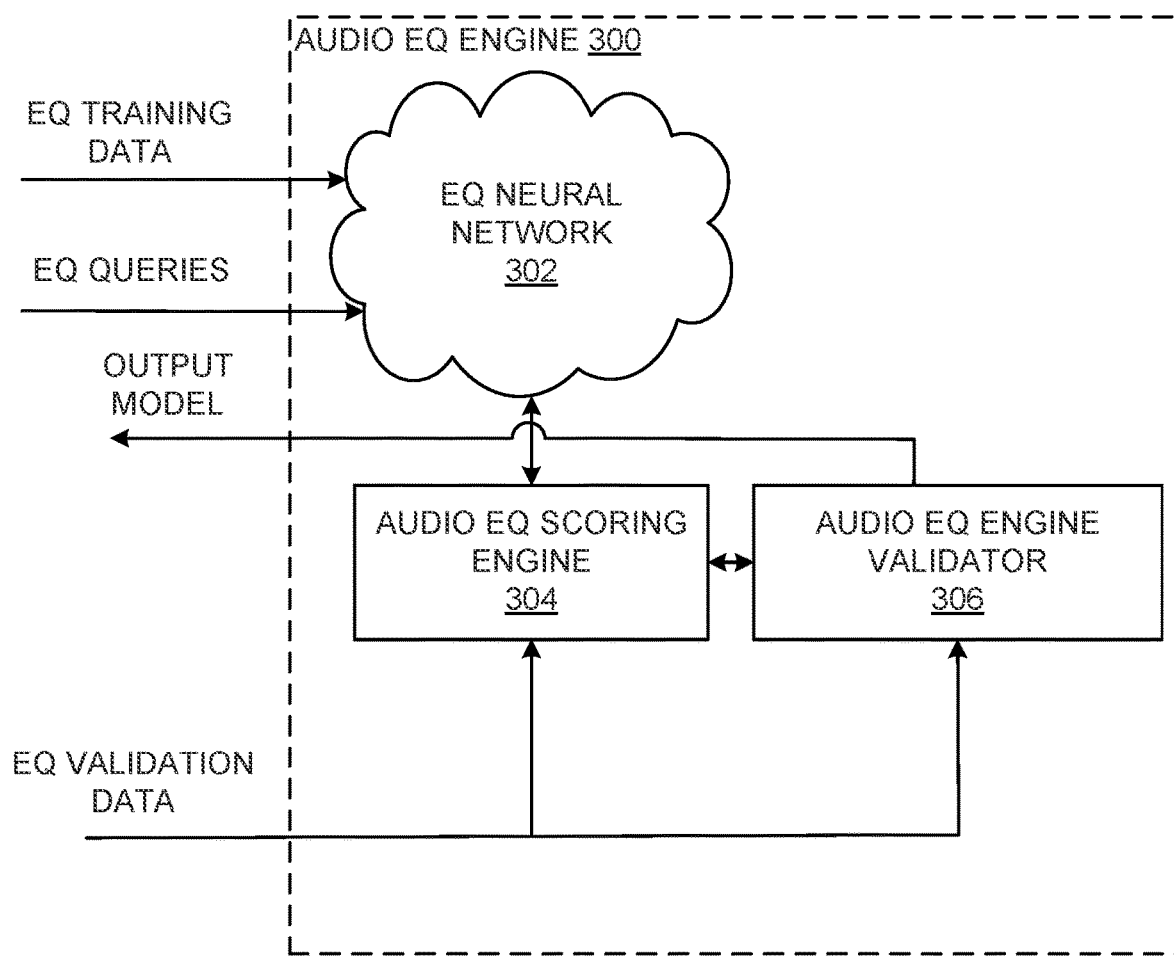
FIG. 3 is a block diagram showing an audio equalization (EQ) engine capable of providing a trained model for use by the media unit of FIGS. 1 and 2.

FIG. 3 is a block diagram showing an audio EQ engine 300 capable of providing a trained model for use by the media unit 106 of FIGS. 1 and 2. In some examples, the trained model resides on the audio EQ engine 300 (e.g., in the EQ neural network 302), while in some examples the trained model is exported for direct use on the media unit 106. In some examples, the audio EQ engine 300 and/or the EQ neural network provides means for generating or providing a trained model.

Machine learning techniques, whether deep learning networks or other experiential/observational learning system, can be used to optimize results, locate an object in an image, understand speech and convert speech into text, and improve the relevance of search engine results, for example. While many machine learning systems are seeded with initial features and/or network weights to be modified through learning and updating of the machine learning network, a deep learning network trains itself to identify "good" features for analysis. Using a multilayered architecture, machines employing deep learning techniques can process raw data better than machines using conventional machine learning techniques. Examining data for groups of highly correlated values or distinctive themes is facilitated using different layers of evaluation or abstraction.

Machine learning techniques, whether neural networks, deep learning networks, and/or other experiential/observational learning system(s), can be used to generate optimal results, locate an object in an image, understand speech and convert speech into text, and improve the relevance of search engine results, for example. Deep learning is a subset of machine learning that uses a set of algorithms to model high-level abstractions in data using a deep graph with multiple processing layers including linear and non-linear transformations. While many machine learning systems are seeded with initial features and/or network weights to be modified through learning and updating of the machine learning network, a deep learning network trains itself to identify "good" features for analysis. Using a multilayered architecture, machines employing deep learning techniques can process raw data better than machines using conventional machine learning techniques. Examining data for groups of highly correlated values or distinctive themes is facilitated using different layers of evaluation or abstraction.

For example, deep learning that utilizes a convolutional neural network (CNN) segments data using convolutional filters to locate and identify learned, observable features in the data. Each filter or layer of the CNN architecture transforms the input data to increase the selectivity and invariance of the data. This abstraction of the data allows the machine to focus on the features in the data it is attempting to classify and ignore irrelevant background information.

Deep learning operates on the understanding that many datasets include high level features which include low level features. While examining an image, for example, rather than looking for an object, it is more efficient to look for edges which form motifs which form parts, which form the object being sought. These hierarchies of features can be found in many different forms of data.

Learned observable features include objects and quantifiable regularities learned by the machine during supervised learning. A machine provided with a large set of well classified data is better equipped to distinguish and extract the features pertinent to successful classification of new data.

A deep learning machine that utilizes transfer learning can properly connect data features to certain classifications affirmed by a human expert. Conversely, the same machine can, when informed of an incorrect classification by a human expert, update the parameters for classification. Settings and/or other configuration information, for example, can be guided by learned use of settings and/or other configuration information, and, as a system is used more (e.g., repeatedly and/or by multiple users), a number of variations and/or other possibilities for settings and/or other configuration information can be reduced for a given situation.

An example deep learning neural network can be trained on a set of expert classified data, for example. This set of data builds the first parameters for the neural network, and this would be the stage of supervised learning. During the stage of supervised learning, the neural network can be tested whether the desired behavior has been achieved. An example flowchart representative of machine readable instructions for training the EQ neural network 302 is illustrated and described in connection with FIG. 5.

Specifically, the example EQ neural network 302 of the illustrated example can be trained using a library of reference audio signals for which audio playback settings have been specifically tailored and optimized (e.g., by an audio engineering). In some examples, the EQ neural network 302 is trained by associating samples of ones of the reference audio signals with the known audio playback settings for the reference audio signals. For example, gain, frequency, and/or Q values for one or more filters that are recommended to be applied to the track can be associated with individual audio signal samples of the track, thus training the EQ neural network 302 to associated similar audio samples with the optimized playback settings (e.g., the gain, frequency, and/or Q values for one or more recommended filters). In some examples, various biases associated with different playback settings can be indicated as well. For example, if a first ten tracks are utilized for training and audio playback settings for the first ten tracks were determined by a first engineer, and a second ten tracks are utilized for training and audio playback settings for the second ten tracks were determined by a second engineer, the EQ neural network 302 may additionally be trained to learn different preferences and/or biases associated with the first and second audio engineers and mitigate these to generate a more objective model.

In some examples, a loss function can be utilized for training the EQ neural network 302. For example, Equation (1), represents one example loss function that can be utilized, where f corresponds to frequency in Hertz, g corresponds to gain in Decibels, and q corresponds to the Q factor (unitless):

$$\mathcal{L}(g, f, q) \propto \|g - \hat{g}\|_2^2 + \|q - \hat{q}\|_2^2 + \|\log_{10}(f) - \log_{10}(\hat{f})\|_2^2 \quad \text{Equation (1)}$$

Once a desired neural network behavior has been achieved (e.g., a machine has been trained to operate according to a specified threshold, etc.), the machine can be deployed for use (e.g., testing the machine with "real" data, etc.). In some examples, the neural network can then be used without further modifications or updates to the neural network parameters (e.g., weights).

In some examples, during operation, neural network classifications can be confirmed or denied (e.g., by an expert user, expert system, reference database, etc.) to continue to improve neural network behavior. The example neural network is then in a state of transfer learning, as parameters for classification that determine neural network behavior are updated based on ongoing interactions. In certain examples, the neural network such as the EQ neural network 302 can provide direct feedback to another process, such as an audio EQ scoring engine 304, etc. In certain examples, the EQ neural network 302 outputs data that is buffered (e.g., via the cloud, etc.) and validated before it is provided to another process.

In the example of FIG. 3, the EQ neural network 302 receives input from previous outcome data associated with audio playback settings training data, and outputs an algorithm to predict audio playback settings associated with audio signals. In some examples, the EQ neural network 302 can be seeded with some initial correlations and can then learn from ongoing experience. In some examples, the EQ neural network 302 continually receives feedback from at least one audio playback settings training data. In some examples, throughout the operational life of the audio EQ engine 300, the EQ neural network 302 is continuously trained via feedback and the example audio EQ engine validator 306 can be updated based on the EQ neural network 302 and/or additional audio playback settings training data as desired. In some examples, the EQ neural network 302 can learn and evolve based on role, location, situation, etc.

In some examples, a level of accuracy of the model generated by the EQ neural network 302 can be determined by an example audio EQ engine validator 306. In such examples, at least one of the audio EQ scoring engine 304 and the audio EQ engine validator 306 receive a set of audio playback settings training data. Further in such examples, the audio EQ scoring engine 304 receives inputs (e.g., CQT data) associated with the audio playback settings validation data and predicts one or more audio playback settings associated with the inputs. The predicted outcomes are distributed to the audio EQ engine validator 306. The audio EQ engine validator 306 additionally receives known audio playback settings associated with the inputs and compares the known audio playback settings with the predicted audio playback settings received from the audio EQ scoring engine 304. In some examples, the comparison will yield a level of accuracy of the model generated by the EQ neural network 302 (e.g., if 95 comparison yield a match and 5 yield an error, the model is 95% accurate, etc.). Once the EQ neural network 302 reaches a desired level of accuracy (e.g., the EQ neural network 302 is trained and ready for deployment), the audio EQ engine validator 306 can output the model to the data store 216 of FIG. 2 for use by the media unit 106 to determine audio playback settings. As such, the model from the EQ neural network 302 can be utilized by the EQ analyzer 208 to determine audio quality parameters for input audio signals. That is, the EQ neural network 302 can determine the threshold audio playback settings an input audio signal can satisfy to have good audio quality. For example, the EQ neural network 302 may determine the EQ audio playback settings for a "rock" song, and the EQ analyzer 208 may identify an input audio signal as "rock," compare the suggested audio playback setting adjustments from the EQ neural network 302 model, and determine if the input audio signal is within a threshold of the "rock" audio playback setting adjustments to determine an audio quality parameter. While an example manner of implementing the audio EQ engine 300 is illustrated in FIG. 3, one or more of the elements, processes and/or devices illustrated in FIG. 3 may be combined, divided, re-arranged, omitted, eliminated and/or implemented in any other way. Further, the example EQ neural network 302, the example audio EQ scoring engine 304, the example audio EQ engine validator 306, and/or, more generally, the example audio EQ engine 300 of FIG. 3 may be implemented by hardware, software, firmware and/or any combination of hardware, software and/or firmware. Thus, for example, any of the example EQ neural network 302, the example audio EQ scoring engine 304, the example audio EQ engine validator 306, and/or, more generally, the example audio EQ engine 300 of FIG. 3 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example EQ neural network 302, the example audio EQ scoring engine 304, the example audio EQ engine validator 306, and/or, more generally, the example audio EQ engine 300 of FIG. 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example audio EQ engine 300 of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
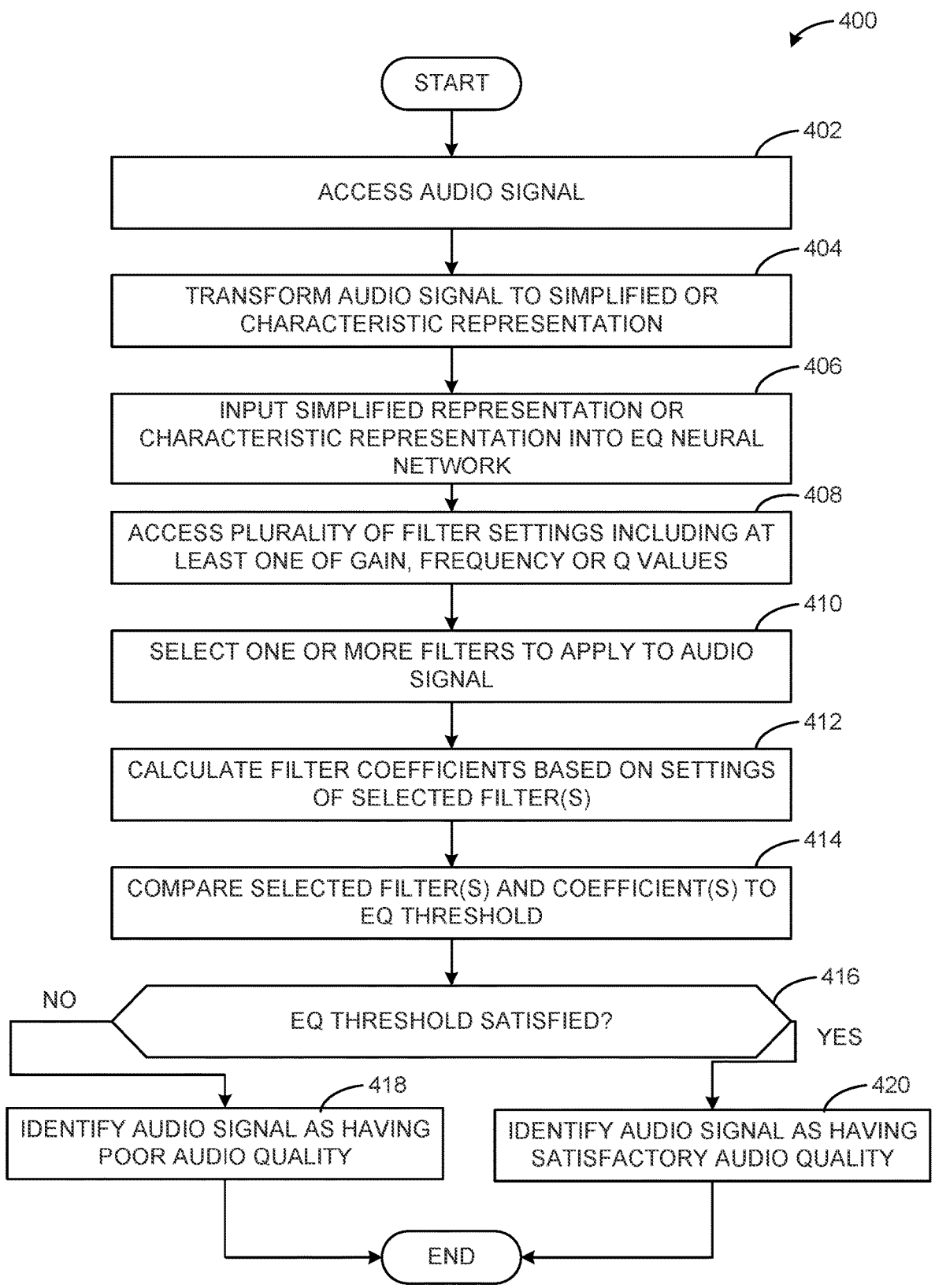
FIG. 4 is a flowchart representative of example machine readable instructions that may be executed to implement the media unit 106 of FIGS. 1 and 2 to determine audio quality.
Figure 5:
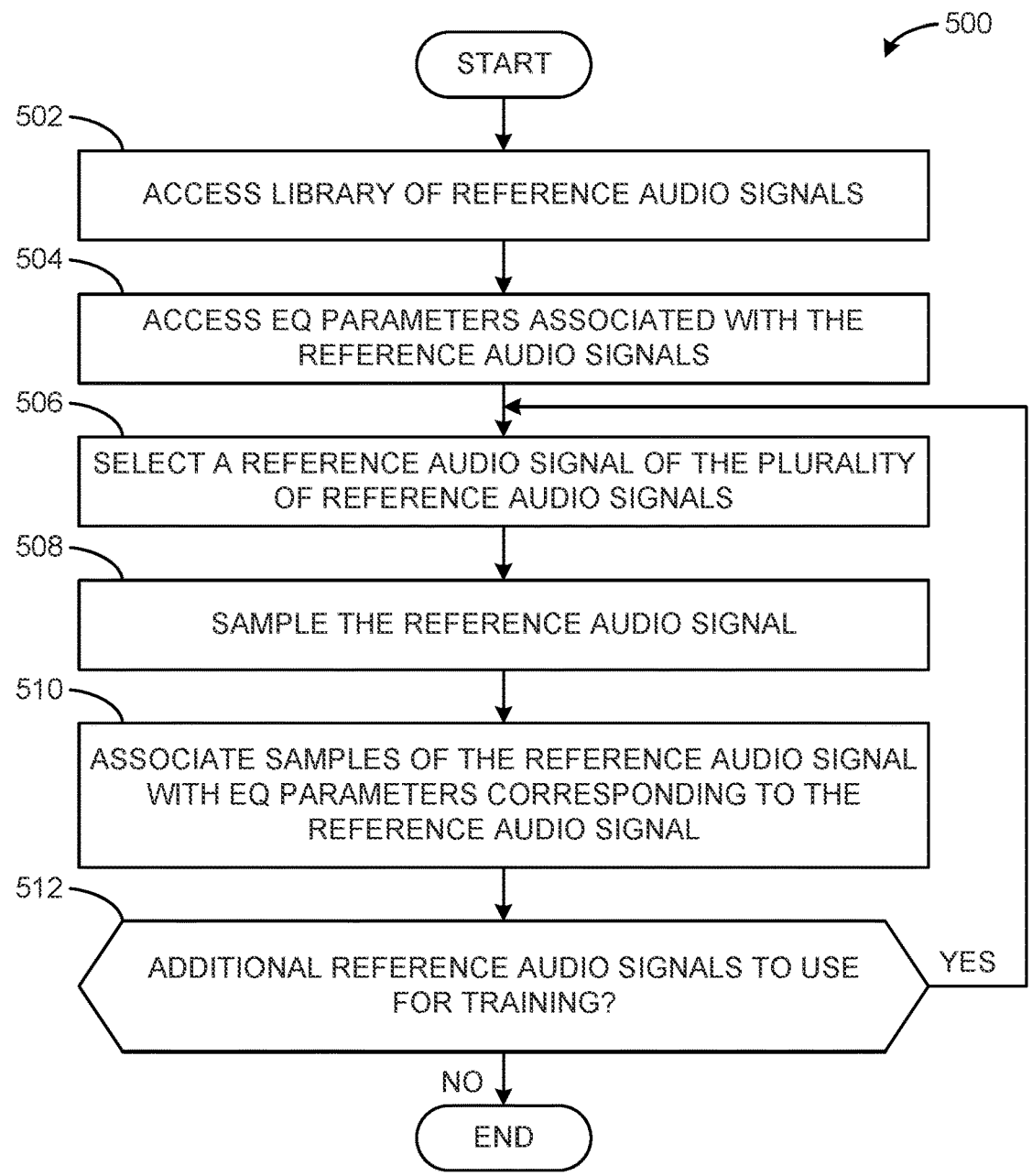
FIG. 5 is a flowchart representative of example machine readable instructions that may be executed to implement the audio EQ engine to train the EQ neural network.

A flowchart representative of example hardware logic circuitry, machine readable instructions, hardware implemented state machines, and/or any combination thereof for implementing the media unit 106 of FIG. 2 is shown in FIG. 4. The machine readable instructions may be one or more executable programs or portion(s) of an executable program for execution by processor circuitry, such as the processor circuitry 612 shown in the example processor platform 600 discussed below in connection with FIG. 6 and/or the example processor circuitry discussed below in connection with FIGS. 8 and/or 9. Also, a flowchart representative of example hardware logic circuitry, machine readable instructions, hardware implemented state machines, and/or any combination thereof for implementing the audio EQ engine of FIG. 3 is shown in FIG. 5. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 8 and/or 9.

The program(s) may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 4, many other methods of implementing the example media unit 106 may alternatively be used. Additionally, although the example program is described with reference to the flowchart illustrated in FIG. 5, many other methods of implementing the example audio EQ engine 300 may alternatively be used For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIG. 4 and/or FIG. 5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3)

at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions and/or example operations 400 that may be executed and/or instantiated by processor circuitry to implement the media unit 106 of FIGS. 1 and 2 to determine audio quality. With reference to the preceding figures and associated descriptions, the machine readable instructions and/or operations 400 of FIG. 4 begin at block 402, at which the example media unit 106 accessing an audio signal (block 402). In some examples the signal transformer 204 accesses the input audio signal 202.

At block 404, the example media unit 106 transforms the audio signal to a simplified representation. In some examples, the signal transformer 204 transforms the input audio signal 202 into a simplified and/or characteristic representation (e.g., a CQT representation, an FFT representation, etc.).

At block 406, the example media unit 106 inputs the simplified representation into an EQ neural network. In some examples, the EQ model query generator 206 inputs the simplified representation of the input audio signal 202 to the EQ neural network 302. In some examples, the EQ model query generator 206 inputs the audio signal 202 to a model output by the EQ neural network 302.

At block 408, the example media unit 106 accesses a plurality of filter settings including gain, frequency, and Q values. In some examples, the EQ analyzer 208 accesses the plurality of filter settings including gain, frequency, and Q values. In some examples, the EQ analyzer 208 accesses a plurality of filter settings (e.g., sets of filter settings) including gain, frequency, and Q values. In some examples, the EQ analyzer 208 accesses one or more high shelf filters, one or more low shelf filters, and/or one or more peaking filters as output by the EQ neural network 302.

At block 410, the example media unit 106 selects one or more filters to apply to the audio signal. In some examples, the EQ analyzer 208 selects one or more filters to apply to the audio signal. For example, to implement a five-band filter, the EQ analyzer 208 may select one low-shelf filter, one high-shelf filter, and three peaking filters out of the sets of filters output by the EQ neural network 302.

At block 412, the example media unit 106 calculates filter coefficients based on settings of the selected filter(s). In some examples, the EQ analyzer 208 calculates filter coefficients based on filter settings of the selected filter(s) to enable application of the one or more filter(s) to the input audio signal 202.

At block 414, the example media unit 106 compares the selected filter(s) and coefficient(s) to EQ threshold. In some examples, the EQ analyzer 208 compares the selected filter(s) and coefficients with filter(s) and coefficient(s) from other audio signals from the EQ neural network 302 model in the data store 210.

At block 416, the example media unit 106 determines if the EQ threshold is satisfied. In some examples, the EQ analyzer 208 determines if the EQ threshold is satisfied. For example, if the required EQ adjustment exceeds a threshold, the EQ analyzer 208 may identify the input audio signal 202 as having poor audio quality because it would require additional EQ adjustments beyond the current EQ parameters (e.g., filter(s), coefficient(s), etc.) (block 418). As such, the EQ analyzer 208 may remove the input audio signal from subsequent processing. However, if the EQ analyzer 208 determines that the EQ threshold is satisfied, the EQ analyzer 208 identifies the audio signal as having satisfactory audio quality (block 420). For example, when the EQ analyzer 208 determines that the EQ adjustments selected for the input audio signal are within the EQ threshold for thee specific type of audio, the EQ analyzer 208 can determine that the input audio signal has satisfactory audio quality, the input audio signal 202 may be utilized in subsequent processing (e.g., playlist recommendation, audio analysis, etc.).

FIG. 5 is a flowchart representative of example machine readable instructions and/or example operations 500 that may be executed and/or instantiated by processor circuitry to implement the audio EQ engine 300 of FIG. 3 to train the EQ neural network. With reference to the preceding figures and associated descriptions, the machine readable instructions and/or operations 400 of FIG. 4 begin at block 402, at which the example audio EQ engine 300 accesses a library of reference audio signals (Block 502). In some examples, the EQ neural network 302 accesses the library of reference audio signals. The library of reference audio signals includes audio signals for which audio playback settings have been determined (e.g., by an expert).

At block 504, the example audio EQ engine 300 accesses EQ parameters associated with the reference audio signals. In some examples, the EQ neural network 302 accesses EQ parameters (e.g., audio playback settings) associated with the reference audio signals. For example, the EQ neural network 302 may accesses one or more filters, one or more gain values, frequencies values, Q values, etc.

At block 506, the example audio EQ engine 300 selects a reference audio signal of the plurality of reference audio signals. In some examples, the EQ neural network 302 selects a reference audio signal of the plurality of reference audio signals.

At block 508, the example audio EQ engine 300 samples the reference audio signal. In some examples, the EQ neural network 302 samples the reference audio signal by creating a pre-determined number of samples out of the audio signal (e.g., three-hundred, five-hundred, etc.).

At block 510, the example audio EQ engine 300 associates the samples of the reference audio signal with EQ parameters (e.g., audio playback settings) corresponding to the reference audio signal. In some examples, the EQ neural network 302 associates the samples of the reference audio signal with EQ parameters corresponding to the reference audio signal.

At block 512 the example audio EQ engine 300 determines whether there are additional reference audio signals to use for training. In some examples, the EQ neural network 302 determines whether there are additional reference audio signals to use for training. In response to there being additional reference audio signals to use for training, processing transfers to block 506. Conversely, in response to there not being additional reference audio signals to use for training, processing terminates.

Figure 6:
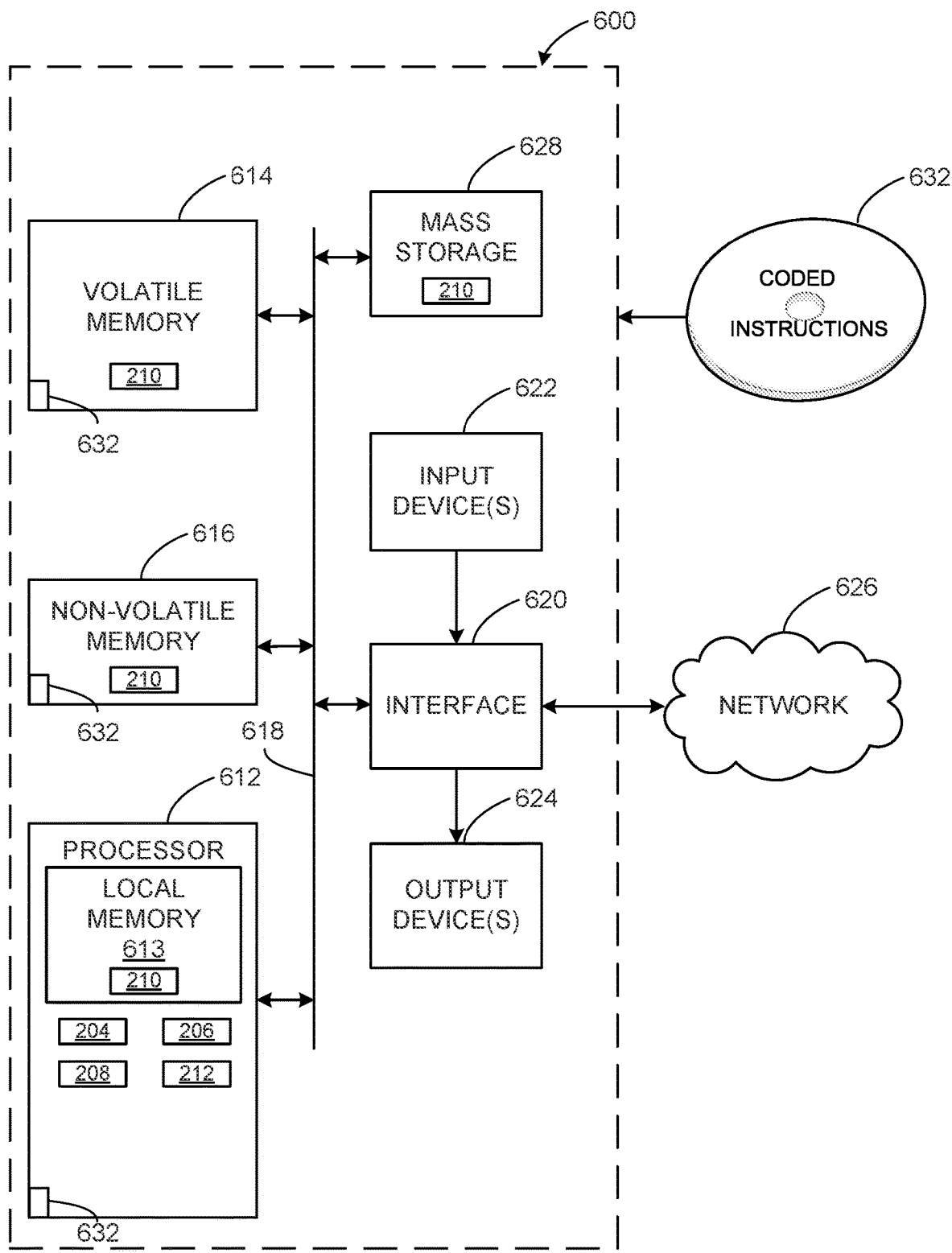
FIG. 6 is a block diagram of an example first processing platform structured to execute the instructions of FIG. 4 to implement the media unit of FIGS. 1 and 2.

FIG. 6 is a block diagram of an example processor platform 600 structured to execute and/or instantiate the machine readable instructions and/or operations of FIG. 4 to implement the media unit 106 of FIGS. 1 and 2. The processor platform 600 can be, for example, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, or other wearable device, or any other type of computing device.

The processor platform 600 of the illustrated example includes processor circuitry 612. The processor circuitry 612 of the illustrated example is hardware. For example, the processor circuitry 612 can be implemented by one or more integrated circuits, logic circuits, FPGAs microprocessors, CPUs, GPUs, DSPs, and/or microcontrollers from any desired family or manufacturer. The processor circuitry 612 may be implemented by one or more semiconductor based (e.g., silicon based) devices. In this example, the processor circuitry 612 implements the example signal transformer 204, the example EQ model query generator 206, the example EQ analyzer 208, the example data store 210, the example update monitor 212 and/or, more generally, the example media store 106 of FIG. 2.

The processor circuitry 612 of the illustrated example includes a local memory 613 (e.g., a cache, registers, etc.). The processor circuitry 612 of the illustrated example is in communication with a main memory including a volatile memory 614 and a non-volatile memory 616 by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617.

The processor platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 622 are connected to the interface circuitry 620. The input device(s) 622 permit(s) a user to enter data and/or commands into the processor circuitry 612. The input device(s) 622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 624 are also connected to the interface circuitry 620 of the illustrated example. The output devices 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 600 of the illustrated example also includes one or more mass storage devices 628 to store software and/or data. Examples of such mass storage devices 628 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 632, which may be implemented by the machine readable instructions of FIG. 4, may be stored in the mass storage device 628, in the volatile memory 614, in the non-volatile memory 616, and/or on a removable non-transitory computer readable storage medium such as a CD or DVD.

Figure 7:
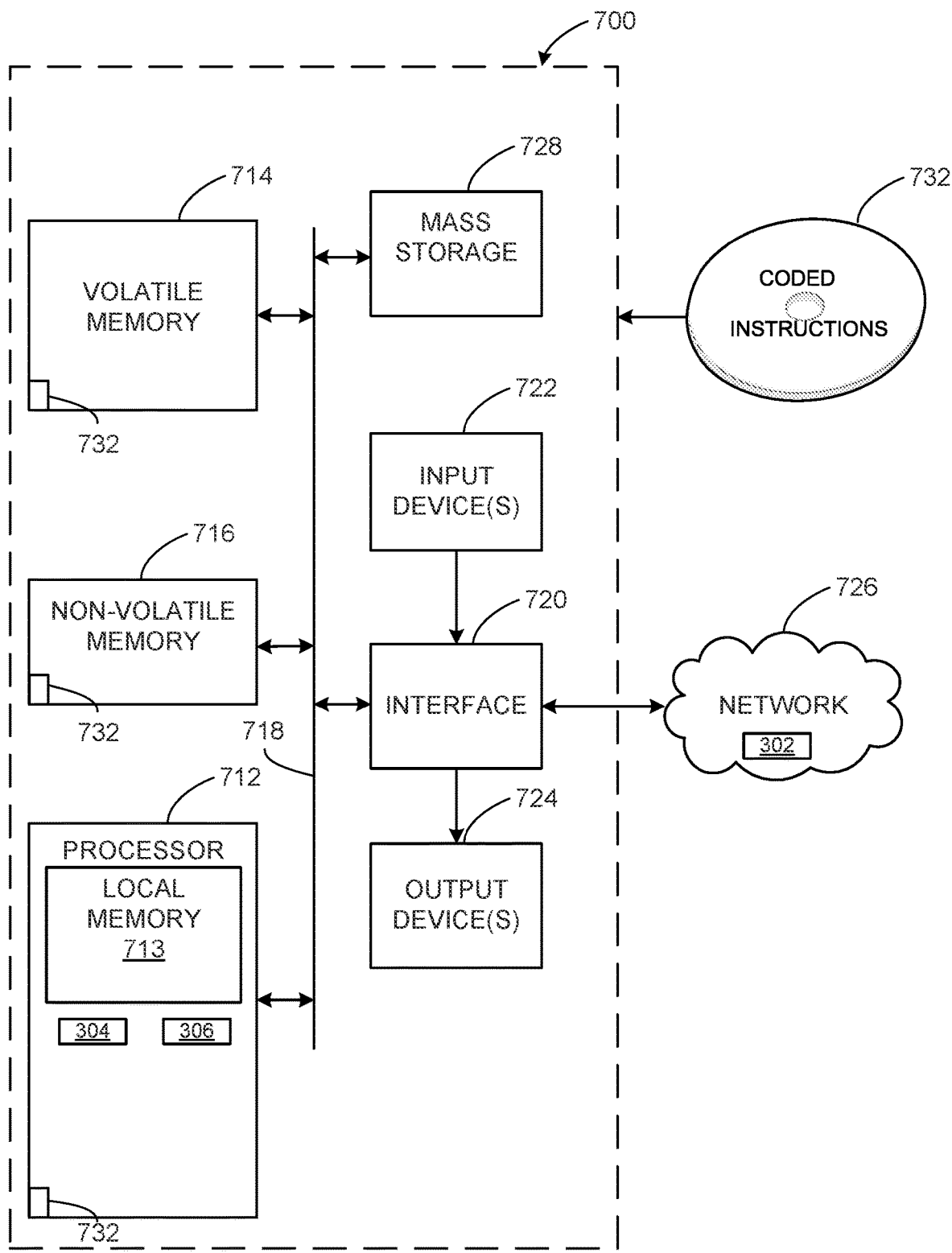
FIG. 7 is a block diagram of an example second processing platform structure to execute the instructions of FIG. 5 to implement the audio EQ engine.

FIG. 7 is a block diagram of an example processor platform 700 structured to execute and/or instantiate the machine readable instructions and/or operations of FIG. 5 to implement the audio EQ engine 300 of FIG. 3. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the example EQ neural network 302, the example audio EQ scoring engine 304, and/or the example audio EQ engine validator 306 and, more generally, the audio EQ engine 300 of FIG. 3.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 722 are connected to the interface circuitry 720. The input device(s) 722 permit(s) a user to enter data and/or commands into the processor circuitry 712. The input device(s) 422 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output devices 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 732, which may be implemented by the machine readable instructions of FIG. 5, may be stored in the mass storage device 728, in the volatile memory 714, in the non-volatile memory 716, and/or on a removable non-transitory computer readable storage medium such as a CD or DVD.

Figure 8:
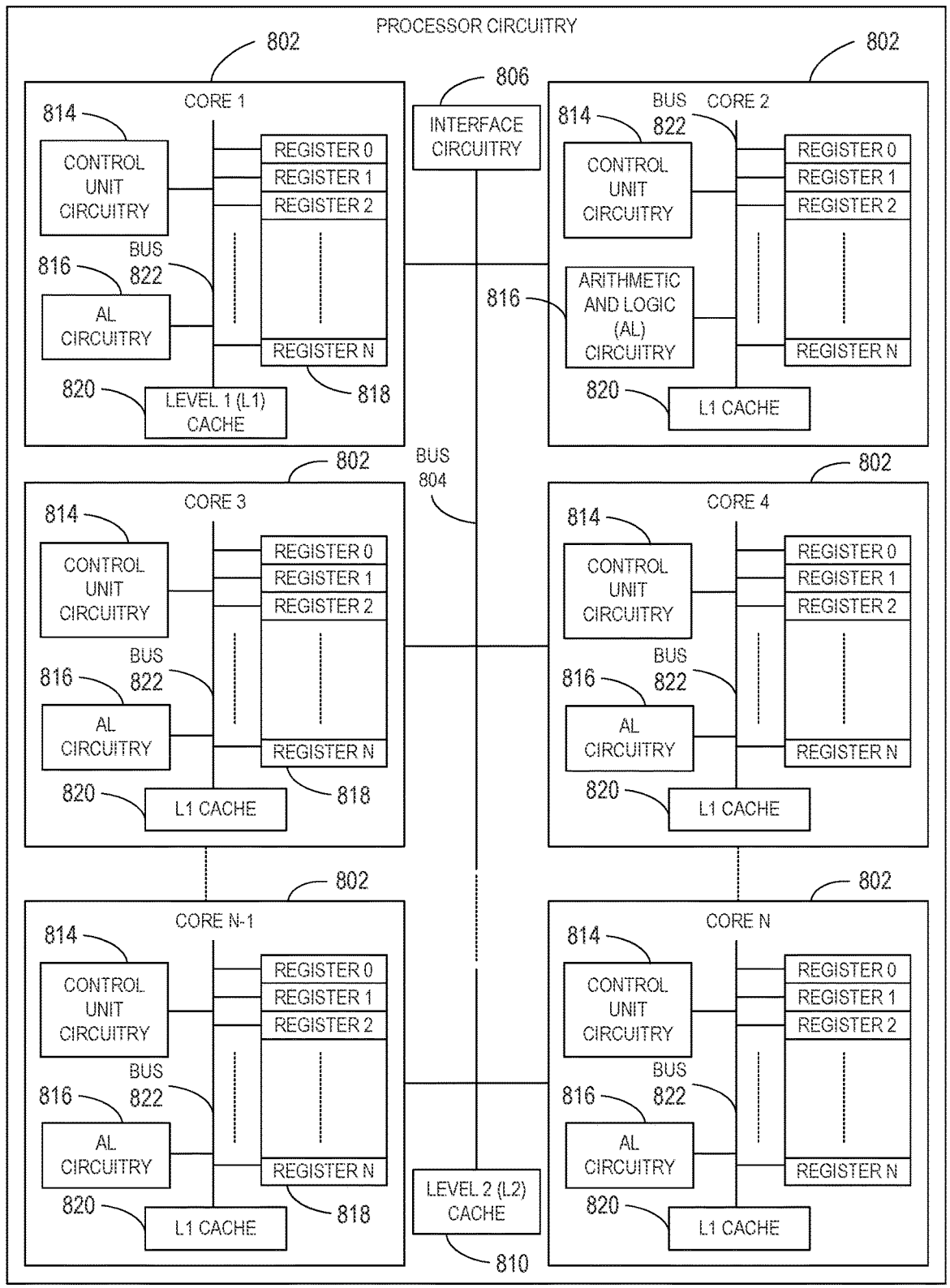
FIG. 8 is a block diagram of an example implementation of the processor circuitry of FIG. 6 and/or FIG. 7.

FIG. 8 is a block diagram of an example implementation of the processor circuitry 612 or FIG. 6 and/or the processor circuitry 712 of FIG. 7. In this example, the processor circuitry 612 of FIGS. 6 and/or 712 of FIG. 7 is implemented by a microprocessor 800. For example, the microprocessor 800 may implement multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowchart of FIG. 4 and/or the flowchart of FIG. 5.

The cores 802 may communicate by an example bus 804. In some examples, the bus 804 may implement a communication bus to effectuate communication associated with one(s) of the cores 802. For example, the bus 804 may implement at least one of an Inter-Integrated Circuit (I2C) bus, a Serial Peripheral Interface (SPI) bus, a PCI bus, or a PCIe bus. Additionally or alternatively, the bus 804 may implement any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2_ cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 614, 616 of FIG. 6 and/or the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the L1 cache 820, and an example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The bus 820 may implement at least one of an I2C bus, a SPI bus, a PCI bus, or a PCIe bus Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
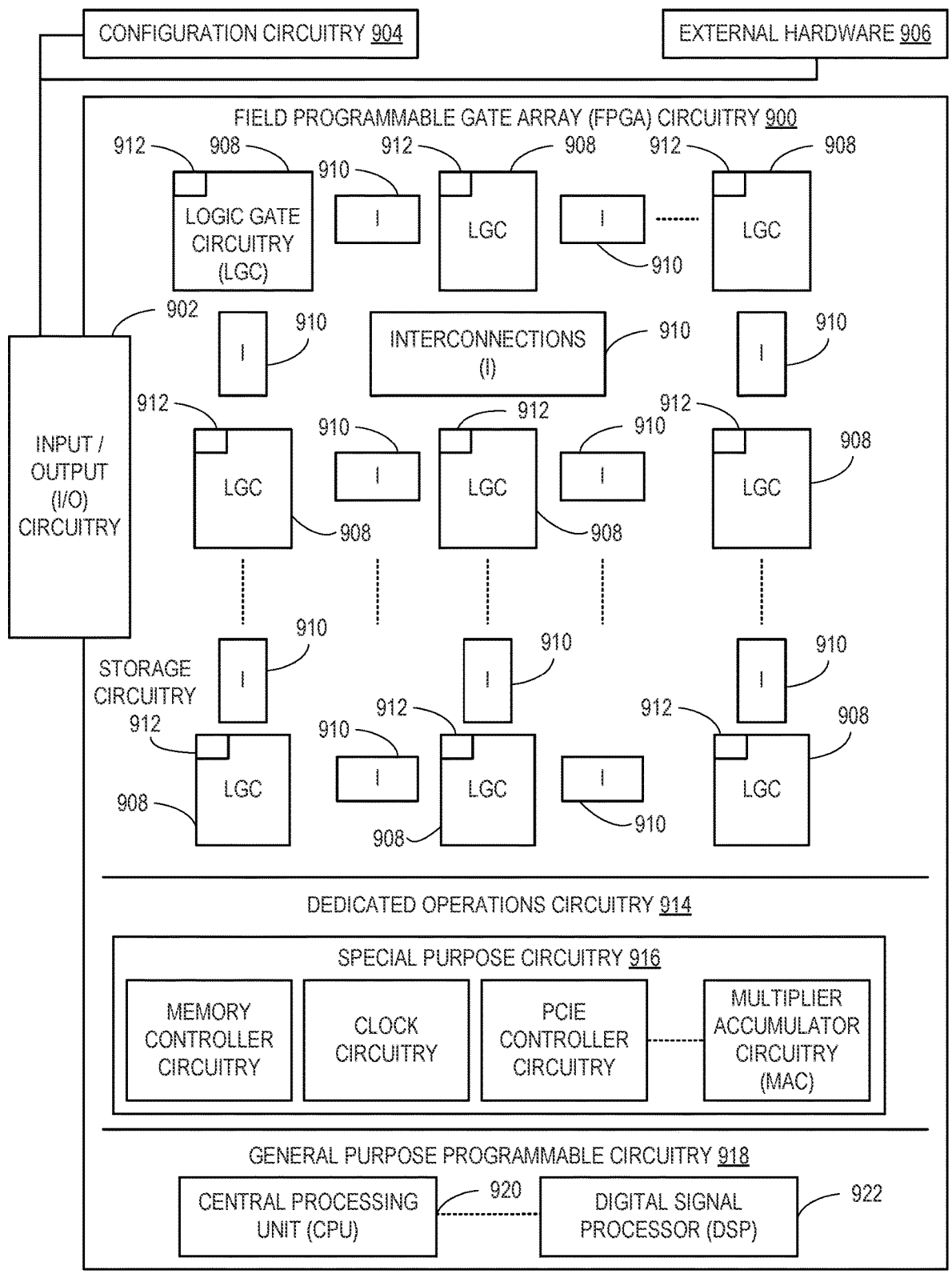
FIG. 9 is a block diagram of another example implementation of the processor circuitry of FIG. 6 and/or FIG. 7.

FIG. 9 is a block diagram of another example implementation of the processor circuitry 612 of FIGS. 6 and/or 712 of FIG. 7. In this example, the processor circuitry 612 and/or 712 is implemented by FPGA circuitry 900. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions represented by the flowchart of FIG. 4 and/or the flowchart of FIG. 5 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowchart of FIG. 4 and/or the flowchart of FIG. 5. In particular, the FPGA 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowchart of FIG. 4 and/or the flowchart of FIG. 5. As such, the FPGA circuitry 900 may be structured to effectively instantiate some or all of the machine readable instructions of the flowchart of FIG. 4 and/or the flowchart of FIG. 5 as dedicated logic circuits to perform the operations corresponding to those software instructions in a dedicated manner analogous to an ASIC. Therefore, the FPGA circuitry 900 may perform the operations corresponding to the some or all of the machine readable instructions of FIG. 4 and/or FIG. 5 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware (e.g., external hardware circuitry) 906. For example, the configuration circuitry 904 may implement interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may implement the microprocessor 800 of FIG. 8. The FPGA circuitry 900 also includes an array of example logic gate circuitry 908, a plurality of example configurable interconnections 910, and example storage circuitry 912. The logic gate circuitry 908 and interconnections 910 are configurable to instantiate one or more operations that may correspond to at least some of the machine readable instructions of flowchart of FIG. 4 and/or the flowchart of FIG. 5 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 612 of FIGS. 6 and/or 712 of FIG. 7, many other approaches are contemplated. For example, as mentioned above, modern FPGA circuitry may include an on-board CPU, such as one or more of the example CPU 920 of FIG. 9. Therefore, the processor circuitry 612 of FIGS. 6 and/or 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowchart of FIG. 4 and/or the flowchart of FIG. 5 may be executed by one or more of the cores 802 of FIG. 8 and a second portion of the machine readable instructions represented by the flowchart of FIG. 4 and/or the flowchart of FIG. 5 may be executed by the FPGA circuitry 900 of FIG. 9.

In some examples, the processor circuitry 612 of FIGS. 6 and/or 712 of FIG. 7 may be in one or more packages. For example, the processor circuitry 800 of FIG. 8 and/or the FPGA circuitry 900 of FIG. 9 may be in one or more packages. In some examples, an XPU may be implemented by the processor circuitry 612 of FIGS. 6 and/or 712 of FIG. 7, which may be in one or more packages. For example, the XPU may include a CPU in one package, a DSP in another package, a GPU in yet another package, and an FPGA in still yet another package.

From the foregoing, it will be appreciated that example methods, apparatus and articles of manufacture have been disclosed that dynamically determine audio quality parameters to adapt to changes in individual tracks, changes between tracks, changes in genres, and/or any other changes in audio signals by analyzing the audio signals and utilizing a neural network to determine optimal audio playback settings. Further, example methods, apparatus, and articles of manufacture have been disclosed that utilize an audio quality determination technique that removes poor audio quality from subsequent processing, thereby improving the operations of a computing device.

Example methods, apparatus, systems, and articles of manufacture to implement symmetric cascade thrust reversers systems are disclosed herein. Further examples and combinations thereof include the following:

Example 1 includes an apparatus including at least one memory, and processor circuitry including one or more of: at least one of a central processing unit, a graphic processing unit or a digital signal processor, at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus; a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations; or Application Specific Integrate Circuitry including logic gate circuitry to perform one or more third operations. The processor circuitry to at least one of perform at least one of the first operations, the second operations or the third operations to: detect an audio signal; transform at least a portion of the audio signal into a simplified representation of the audio signal to provide a first sample of the audio signal; send a first query to a neural network based on the first sample of the audio signal; access a plurality of equalization settings determined by the neural network based on the first query; compare the equalization settings to an equalization threshold; in response to the equalization settings not satisfying the equalization threshold, remove the audio signal from subsequent processing; and in response to the equalization settings satisfying the equalization threshold, identify the audio signal as satisfactory audio quality for subsequent processing.

Example 2 includes the apparatus of example 1, where the simplified representation of the audio signal is provided via at least one of a constant-Q transformation or a Fourier transform.

Example 3 includes the apparatus of examples 1 or 2, where the audio signal is music, and wherein the processor circuitry is to select the equalization threshold based on a genre of the audio signal.

Example 4 includes the apparatus of examples 1-3, where the neural network is a convolutional neural network, and wherein the processor circuitry is to train the neural network using a library of reference media with corresponding optimized equalization profiles.

Example 5 includes the apparatus of examples 1-4, where the processor circuitry is to recommend the audio signal for addition to a playlist in response to identifying the audio signal as satisfactory audio quality for subsequent processing.

Example 6 includes the apparatus of examples 1-5, where the processor circuitry is to calculate a filter coefficient to be applied to the audio signal, select a filter to be applied to the audio signal, and apply the filter to determine an audio quality parameter in response to identifying the audio signal as satisfactory audio quality for subsequent processing.

Example 7 includes the apparatus of examples 1-6, where the processor circuitry is to apply the filter includes adjusting at least one of gain, frequency or quality factor (Q) value of the audio signal.

Example 8 includes the apparatus of examples 1-7, where the processor circuitry is to: monitor a duration after the comparison of the equalization settings to an equalization threshold; and if the duration satisfies an update duration threshold, send an additional query based on a second sample, the second sample subsequent to the first sample.

Example 9 includes instructions, which when executed, cause a processor to: detect an audio signal; transform at least a portion of the audio signal into a simplified representation of the audio signal to provide a first sample of the audio signal; send a first query to a neural network based on the first sample of the audio signal; access a plurality of equalization settings determined by the neural network based on the first query; compare the equalization settings to an equalization threshold; in response to the equalization settings not satisfying the equalization threshold, remove the audio signal from subsequent processing; and in response to the equalization settings satisfying the equalization threshold, identify the audio signal as satisfactory audio quality for subsequent processing.

Example 10 includes the instructions of example 9, where the simplified representation of the audio signal is provided via at least one of a constant-Q transformation or a Fourier transform.

Example 11 includes the instructions of examples 9 or 10, where the audio signal is music, and wherein the instructions further cause the processor to select the equalization threshold based on a genre of the audio signal.

Example 12 includes the instructions of examples 9-11, where the neural network is a convolutional neural network, and wherein the instructions further cause the processor to train the neural network using a library of reference media with corresponding optimized equalization profiles.

Example 13 includes the instructions of examples 9-12, where the instructions further cause the processor to recommend the audio signal for addition to a playlist in response to identifying the audio signal as satisfactory audio quality for subsequent processing.

Example 14 includes the instructions of examples 9-13, where the instructions further cause the processor to calculate a filter coefficient to be applied to the audio signal, select a filter to be applied to the audio signal, and apply the filter to determine an audio quality parameter in response to identifying the audio signal as satisfactory audio quality for subsequent processing.

Example 15 includes the instructions of examples 9-14, where the instructions further cause the processor to apply the filter includes adjusting at least one of gain, frequency or quality factor (Q) value of the audio signal.

Example 16 includes the instructions of examples 9-15, where the instructions further cause the processor to: monitor a duration after the comparison of the equalization settings to an equalization threshold; and if the duration satisfies an update duration threshold, send an additional query based on a second sample, the second sample subsequent to the first sample.

Example 17 includes a method including: detecting an audio signal; transforming at least a portion of the audio signal into a simplified representation of the audio signal to provide a first sample of the audio signal; sending a first query to a neural network based on the first sample of the audio signal; accessing a plurality of equalization settings determined by the neural network based on the first query; comparing the equalization settings to an equalization threshold; in response to the equalization settings not satisfying the equalization threshold, removing the audio signal from subsequent processing; and in response to the equalization settings satisfying the equalization threshold, identifying the audio signal as satisfactory audio quality for subsequent processing.

Example 18 includes the method of example 17, where the simplified representation of the audio signal is provided via at least one of a constant-Q transformation or a Fourier transform.

Example 19 includes the method of examples 17 or 18, where the audio signal is music and further including selecting the equalization threshold based on a genre of the audio signal.

Example 20 includes the method of examples 17-19, the neural network is a convolutional neural network and further including training the neural network using a library of reference media with corresponding optimized equalization profiles.

Example 21 includes the method of examples 17-20, where subsequent processing includes recommending the audio signal for addition to a playlist.

Example 22 includes the method of examples 17-21, where subsequent processing includes calculating a filter coefficient to be applied to the audio signal, selecting a filter to be applied to the audio signal, and applying the filter to determine an audio quality parameter.

Example 23 includes the method of examples 17-22, where applying the filter includes adjusting at least one of gain, frequency or quality factor (Q) value of the audio signal.

Example 24 includes the method of examples 17-23, further including monitoring a duration after the comparison of the equalization settings to an equalization threshold; and if the duration satisfies an update duration threshold, sending an additional query based on a second sample, the second sample subsequent to the first sample.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

I claim:

1. A tangible, non-transitory computer readable medium comprising instructions, which when executed, cause one or more processors to perform a set of operations comprising:
   transforming at least a portion of an audio signal into a simplified representation of the audio signal;
   inputting the simplified representation into an equalization neural network;
   based on inputting the simplified representation into the equalization neural network, determining equalization settings;
   determining whether the equalization settings satisfy an equalization threshold; and
   in response to determining that the equalization settings satisfy the equalization threshold, identifying the audio signal as satisfactory audio quality for subsequent processing and applying a filter coefficient to the audio signal to determine an audio quality parameter of the audio signal.

2. The tangible, non-transitory computer readable medium of claim 1, wherein the simplified representation comprises a constant-Q transformation of the audio signal.

3. The tangible, non-transitory computer readable medium of claim 1, wherein the simplified representation comprises a Fourier transform of the audio signal.

4. The tangible, non-transitory computer readable medium of claim 1, wherein the audio signal comprises music.

5. The tangible, non-transitory computer readable medium of claim 1, wherein determining whether the equalization settings satisfy an equalization threshold is based determining a genre of the audio signal.

6. The tangible, non-transitory computer readable medium of claim 1, wherein the equalization neural network comprises a convolutional neural network.

7. The tangible, non-transitory computer readable medium of claim 6, wherein the set of operations further comprises training the equalization neural network using a library of reference media that correspond with equalization profiles.

8. The tangible, non-transitory computer readable medium of claim 1, wherein the set of operations further comprises determining that the equalization settings do not satisfy the equalization threshold and removing the audio signal from subsequent processing.

9. The tangible, non-transitory computer readable medium of claim 1, wherein the set of operations further comprises, in response to identifying the audio signal as satisfactory audio quality for subsequent processing, recommending the audio signal for addition to at least one playlist.

10. A computer-implemented method comprising:
   transforming at least a portion of an audio signal into a simplified representation of the audio signal;
   inputting the simplified representation into an equalization neural network;
   based on inputting the simplified representation into the equalization neural network, determining equalization settings;
   determining whether the equalization settings satisfy an equalization threshold; and
   in response to determining that the equalization settings satisfy the equalization threshold, identifying the audio signal as satisfactory audio quality for subsequent processing and applying a filter coefficient to the audio signal to determine an audio quality parameter of the audio signal.

11. The computer-implemented method of claim 10, wherein the simplified representation comprises a constant-Q transformation of the audio signal.

12. The computer-implemented method of claim 10, wherein the simplified representation comprises a Fourier transform of the audio signal.

13. The computer-implemented method of claim 10, wherein the audio signal comprises music.

14. The computer-implemented method of claim 10, wherein determining whether the equalization settings satisfy an equalization threshold is based determining a genre of the audio signal.

15. The computer-implemented method of claim 10, wherein the equalization neural network comprises a convolutional neural network.

16. The computer-implemented method of claim 15, further comprising training the equalization neural network using a library of reference media that correspond with equalization profiles.

17. The computer-implemented method of claim 10, further comprising determining that the equalization settings do not satisfy the equalization threshold and removing the audio signal from subsequent processing.

18. The computer-implemented method of claim 10, further comprising, in response to identifying the audio signal as satisfactory audio quality for subsequent processing, recommending the audio signal for addition to at least one playlist.

19. A computing device comprising:
   one or more processors; and
   a tangible, non-transitory computer readable medium comprising instructions, which when executed, cause the one or more processors to perform a set of operations comprising:
      transforming at least a portion of an audio signal into a simplified representation of the audio signal;
      inputting the simplified representation into an equalization neural network;
      based on inputting the simplified representation into the equalization neural network, determining equalization settings;
      determining whether the equalization settings satisfy an equalization threshold; and
      in response to determining that the equalization settings satisfy the equalization threshold, identifying the audio signal as satisfactory audio quality for subsequent processing and applying a filter coefficient to the audio signal to determine an audio quality parameter of the audio signal.

20. The computing device of claim 19, wherein the equalization neural network comprises a convolutional neural network.

* * * * *